United States Patent
Wu et al.

(10) Patent No.: US 7,333,106 B1
(45) Date of Patent: Feb. 19, 2008

(54) METHOD AND APPARATUS FOR Z-BUFFER OPERATIONS

(75) Inventors: Tsailai Terry Wu, San Jose, CA (US); Ming Chen, San Jose, CA (US)

(73) Assignee: Silicon Motion, Inc., Milpitas, CA (US)

( * ) Notice: Subject to any disclaimer, the term of this patent is extended or adjusted under 35 U.S.C. 154(b) by 311 days.

(21) Appl. No.: 10/402,304

(22) Filed: Mar. 27, 2003

(51) Int. Cl.
*G06T 15/40* (2006.01)

(52) U.S. Cl. ...................... 345/422; 345/421; 345/531; 345/532; 345/536; 345/542; 345/559

(58) Field of Classification Search ................ 345/559, 345/542, 536, 532, 531, 422, 421
See application file for complete search history.

(56) References Cited

U.S. PATENT DOCUMENTS

| | | | | |
|---|---|---|---|---|
| 5,038,297 A | * | 8/1991 | Hannah | 345/422 |
| 5,301,263 A | * | 4/1994 | Dowdell | 345/422 |
| 5,544,306 A | * | 8/1996 | Deering et al. | 345/545 |
| 5,561,750 A | | 10/1996 | Lentz | |
| 6,580,427 B1 | * | 6/2003 | Orenstein et al. | 345/422 |

* cited by examiner

*Primary Examiner*—Kimbinh T. Nguyen
(74) *Attorney, Agent, or Firm*—Blakely, Sokoloff, Taylor & Zafman LLP (57) ABSTRACT

In one embodiment, the invention is an apparatus. The apparatus includes a Z-buffer memory. The apparatus also includes a set of bits, each of which corresponds to a block of the Z-buffer memory. The apparatus also includes an initialization (init) register. The apparatus also includes control logic coupled to the Z-buffer memory, the set of bits, and the init register. The control logic sets the set of bits upon receipt of an initialization request. The control logic retrieves a Z value from either the init register or from the Z-buffer memory according to the states of the set of bits.

25 Claims, 9 Drawing Sheets

METHOD AND APPARATUS FOR Z-BUFFER OPERATIONS

FIELD OF THE INVENTION

This invention relates generally to the field of graphics control and more specifically to managing data transactions in a graphics controller subsystem.

BACKGROUND

Graphics subsystem rendering 3D graphics typically include a Z-buffer used to determine the depth of an image for rendering purposes. For an LCD (Liquid Crystal Display) or similar display device with 1024×768 cells and 16 bits of Z-buffer data per cell, a 1.5MB buffer may be required. It is common to initialize each entry in the Z-buffer, or a well-defined subset of the entries in the Z-buffer based on a background value (usually set to a number representing indefinitely far way, or the maximum number). Executing a write to each individual data location can be a slow, inefficient process. Furthermore, once a Z-buffer is initialized, painting objects includes determining whether the object is in the foreground or the background relative to an image already painted. This determination includes reading the current Z-value and comparing that to a potential new Z-value, and then either allowing the write to occur or canceling it as appropriate based on whether the data to be written is in the foreground or the background.

Thus, it would be advantageous to provide a method of quickly initializing and quickly reading values of a Z-buffer.

SUMMARY OF THE DESCRIPTION

One embodiment of the present invention uses a set of bits for the initialization of Z-buffer memory. Each bit of the set of bits corresponding to a block of the Z-buffer memory. During the initialization of the Z-buffer memory, the set of bits are set to a predetermined value (e.g., 1), without writing to the Z-buffer. The predetermined value in one of the set of bits indicates that the value in a register (e.g., INIT register) is used when the block associated with the corresponding one of the set of bits is read; and, the value in the register is used as the background value in a Z comparison operation when the corresponding bit has the predetermined value. Thus, no write to the Z-buffer memory is necessary in the initialization process; and, Z-buffer read is reduced (e.g., before the Z values for visible objects are written into the blocks of Z-buffer memory).

In one embodiment, the invention is an apparatus. The apparatus includes a Z-buffer memory. The apparatus also includes a set of bits, each of which corresponds to a block of the Z-buffer memory. The apparatus also includes an initialization (init) register. The apparatus also includes control logic coupled to the Z-buffer memory, the set of bits, and the init register. The control logic sets the set of bits upon receipt of an initialization request to speed up initialization and to avoid writing to the Z-buffer memory during the initialization process. The control logic retrieves a Z value from either the init register or from the Z-buffer memory according to the states of the set of bits. When the corresponding block is determined to be unmodified since initialization, according to the corresponding bit of the set of bits, the control logic uses the value of the init register as the background Z value to avoid reading Z-buffer memory.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to an or one embodiment in the present disclosure are not necessary to the same embodiment; and, such references means at least one.

A method and apparatus for zero-cycle initialization and reading of a Z-buffer is described. Status bits related to sectors (or blocks) of the Z-buffer are used to determine which sectors of the Z-buffer are in a state in which the value stored in an initialization register represents the value in the corresponding sectors of the Z-buffer. Those same status bits are then used to determine whether modifications have been made to the sectors, when data is to be read from the sectors. In one embodiment of the present invention, if no modification is made, the data is read from the initialization register, rather than requiring a time-consuming access to memory. The status bits and initialization register are preferably easily accessible logic or registers separate from the memory including the Z-buffer.

In one embodiment of the present invention, instead of writing the whole Z-buffer memory for initialization, a set of bits are set to 1 to indicate that the corresponding blocks represented by the set of bits are initialized to an initial value. The initial value is stored in a register for fast access. The set of bits with a value of 1 indicate that the Z value for the corresponding blocks should be read from the register. No write to Z-buffer is necessary in the initialization. Thus, the initialization process is sped up. When the Z-buffer memory is referenced for depth comparison (Z comparison), the register is read for the initial value if the bit for the corresponding block having a value of 1. The initial value in the register represents the background Z value. When the Z-buffer memory is updated after a foreground image is painted, the corresponding bit for the block of the Z-buffer memory is set to 0 to indicate that the initial value in the register is no longer valid for the block; and, the Z-buffer memory is read for Z comparison. Thus, before the Z-buffer memory is updated, the register is read for the initial background Z value; and Z-buffer read can be reduced.

Figure 1:
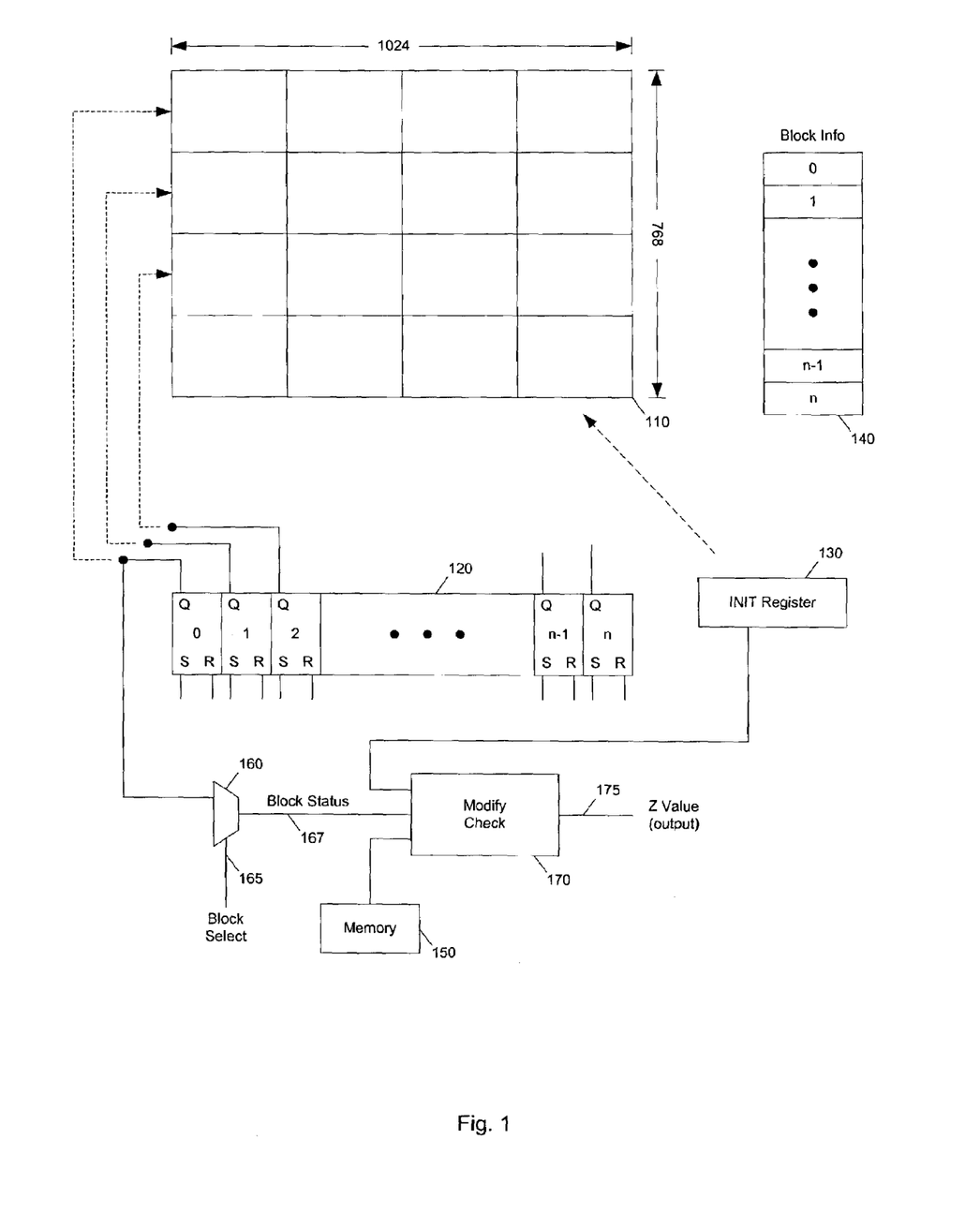
FIG. 1 illustrates an embodiment of an apparatus which may be used for zero-cycle initialization and reads of Z-buffers.

FIG. 1 illustrates an embodiment of an apparatus which may be used for zero-cycle initialization and reads of Z-buffers. Screen 110 represents a Z-buffer corresponding to an LCD screen or a similar monitor as used in various computer systems and similar devices. Flip-flop bank 120 includes n+1 flip-flops which correspond to sectors of screen 110. These sectors correspond to the flip-flops as indicated by the arrows in one embodiment. In one embodiment of the present invention, the correspondence is hard wired. In another embodiment of the present invention, the correspondence is determined by programmable block information 140, which may be a set of registers having stored therein start and end addresses in memory for each sector. In a further embodiment, block information 140 may be implemented as a single register having stored therein an indication of the size of each of a uniform set of blocks, thus setting up an indexing or similar structure. INIT Register 130 may store an initialization value which may be used for a variety of purposes in various embodiments.

In one embodiment, INIT register 130 is preprogrammed to a predetermined value to which a program indicates various sectors of the screen 110 (Z-buffer) should be initialized. For example, a portion of screen 110 may be initialized for purposes of providing a background at a predetermined depth on the screen as displayed, so each sector containing part of the background may be initialized to the predetermined value. The flip-flops 120 are initialized to have a value of 1 during initialization; and, the actual Z-buffer memory (150) is not initialized during the initialization. In one embodiment of the present invention, all flip-flops 120 are set (e.g., to a value of 1) in response to a single command during the initialization process. Note that a mask can be set to set only a portion of the flip-flops, according to the mask, to initialize the corresponding portion of the Z-buffer blocks.

During subsequent operations, writes to graphics memory are executed based on whether the depth of the current image is greater or less than the depth of the background image to be written, thus implicating the Z-buffer. As a result, each time a write to graphics memory is executed, a read of the corresponding Z-buffer entry occurs, and a corresponding write to the Z-buffer memory may also occur. Furthermore, there may be separate reads of memory in the Z-buffer.

In one embodiment, the bank of flip-flops 120 has its outputs steered to a block select multiplexer (mux) 160. When a read to the Z-buffer is requested, the block select signal 165 determines which flip-flop 120 output to provide as the block status signal 167. The block status signal 167 is provided to a modify check logic block 170, along with data from the INIT register 130 and data from a memory 150 when necessary. The memory 150 contains the actual Z-buffer data corresponding to screen 110. The modify check block 170 checks whether the block status signal 167 is 1 or 0. If block status 167 is 1, no modifications have occurred in that sector since initialization; and, the data from the INIT register 130 is used for the purposes of fulfilling the read request.

Note that the path from memory 150 to modify check 170 may not provide data immediately to the modify check block. Preferably, modify check 170 only requests data from memory 150 when the sector corresponding to the flip-flop 120 in question has been modified. When the block status signal 167 is 0, the data block has been modified; and, the data must be requested from memory 150 to satisfy the read request. When writes occur to the Z-buffer, a determination is made as to which sector includes the data to be written. The flip-flop 120 corresponding to that sector is set to 0 (e.g., regardless of its former value) to indicate that a modification has been made to the data block in question. Since such a write includes the comparison described above, a demultiplexer (demux) not shown in the illustration may be used to route a reset signal to the appropriate flip-flop 120 using the block select signal 165. Also, as will be appreciated, if the INIT register 130 is reprogrammed after the initialization occurs, then the modification status may not relate to the value in the INIT register 130. In one embodiment, this is handled by resetting the flip-flops 120.

Figure 2:
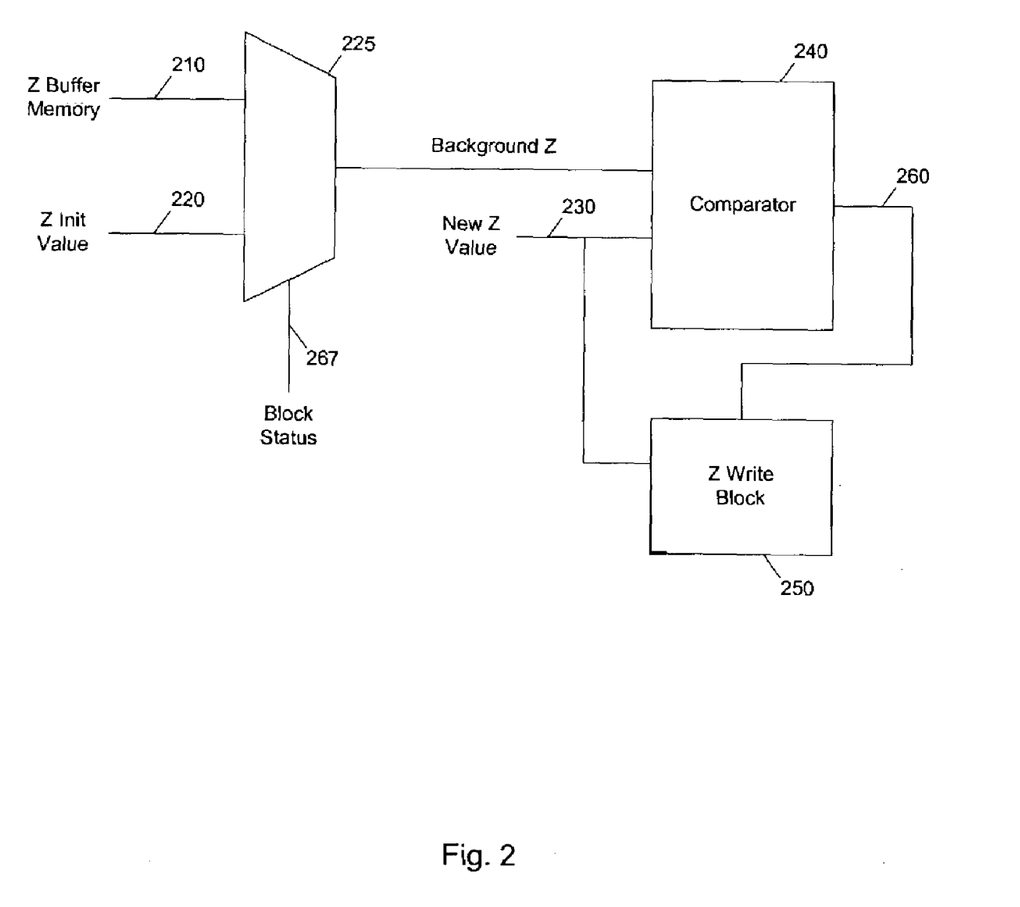
FIG. 2 illustrates an embodiment of comparison circuitry.

FIG. 2 illustrates an embodiment of comparison circuitry. Multiplexer 225 (MUX 225) receives as inputs Z-buffer memory data 210 and Z-buffer INIT value 220. Block Status signal 267 selects one of the inputs to MUX 225 as an output from MUX 225. The output of MUX 225 is provided as an input to comparator 240, along with the potential New Z-buffer value 230 for comparison. The output 260 of the comparator 240 is provided as an input to a Z-buffer write logic block 250, along with the new Z-buffer value 230, which may execute or cancel the write depending on the comparison output 260.

Figure 3:
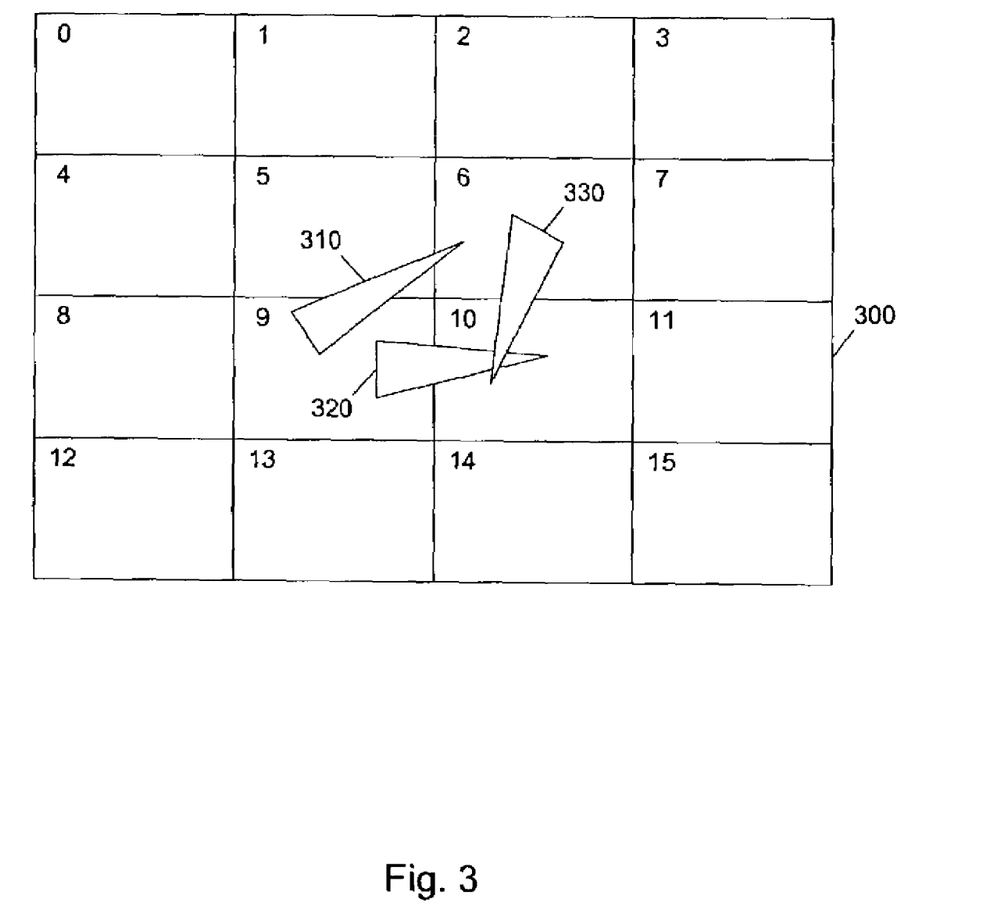
FIG. 3 illustrates an embodiment of a Z-buffer.

FIG. 3 illustrates an embodiment of a Z-buffer. In one embodiment of the present invention, Z-buffer 300 is divided into 16 sectors numbered 0-15. A corresponding flip-flop or bit is set high for each sector during the initialization process. At a later time, triangle 310 is written into the Z-buffer (and any other corresponding graphics memory), causing data in sectors 5, 6, and 9 to be modified. The corresponding bits for sectors 5, 6 and 9 are set low, indicating that modifications have been made in the sectors in question. Later still, triangle 320 is written, affecting sectors 9 and 10. For purposes of writing into sector 9, triangle 320 is compared to the actual memory values for the Z-buffer, even though there is no overlap with triangle 310. As a result of the write, sector 10 is now marked as modified (corresponding bit is set low). At yet a later time, triangle 330 is written, with comparisons to memory in sectors 6 and 10 as a result, and with some overlap over triangle 320. As sectors 6 and 10 were already known to be modified, no further reset of the corresponding bits needs to occur. Alternatively, the bits may be reset each time a modification occurs. Some embodiments of graphics systems in general have been shown to modify each Z-buffer bit 2-3 times (on average) between initialization, so at least the first Z buffer read may be completed quickly by using the INIT register and avoiding the slower request to memory. Note that when a portion of a block of Z-buffer is modified from a state in which the entire block of Z-buffer is represented by the INIT register, unmodified portion of the block of Z-buffer is initialized to the value of the INIT register.

Figure 4:
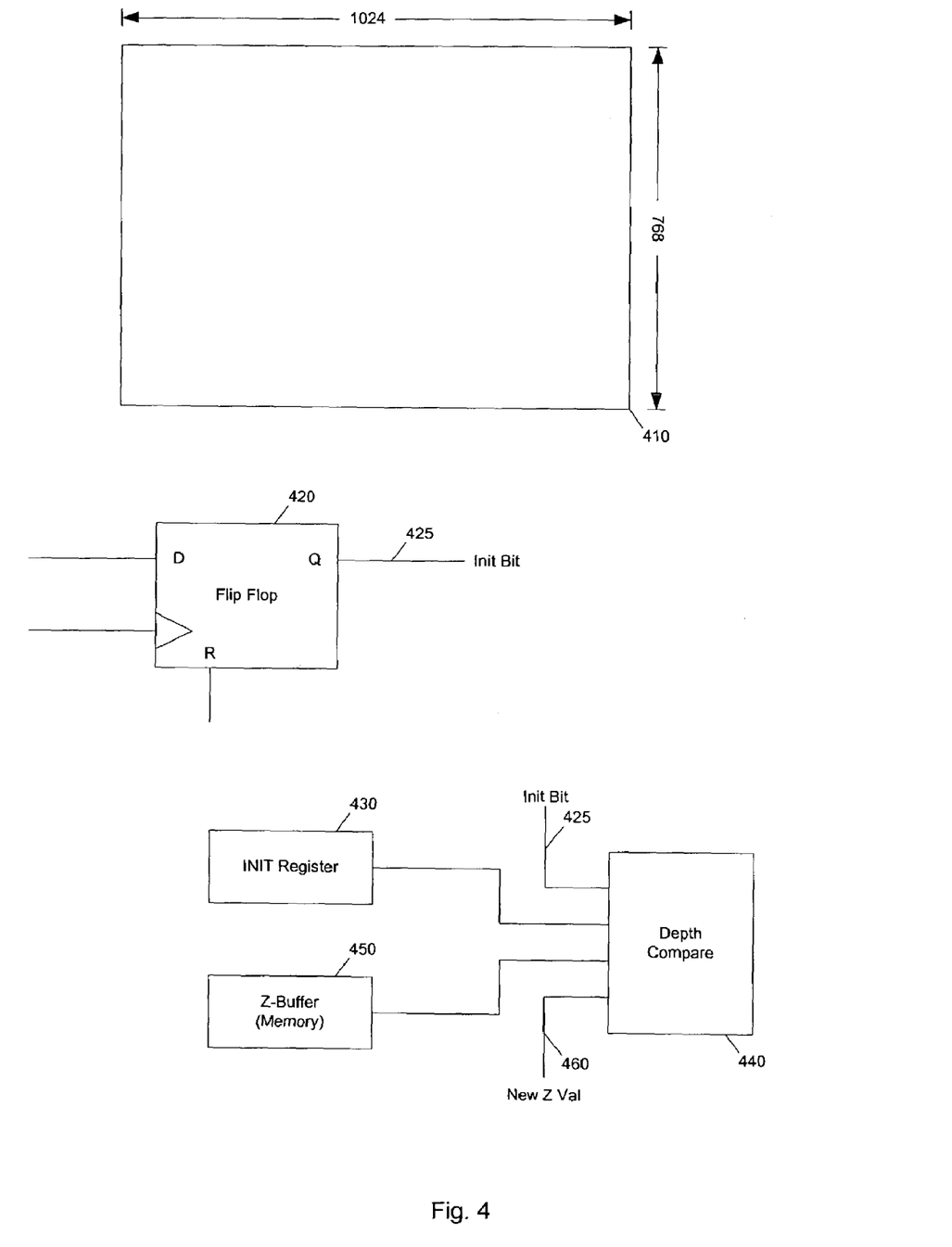
FIG. 4 illustrates an alternate embodiment of an apparatus which may be used for zero-cycle initialization and reads of Z-buffers.

FIG. 4 illustrates an alternate embodiment of an apparatus which may be used for zero-cycle initialization and reads of Z-buffers. Screen 410 is a representation of a Z-buffer for an LCD screen or similar monitor. Flip-flop 420 is used to store Init Bit 425 for one block (sector) of the Z-buffer. Init Bit 425 indicate whether the value in INIT register 430 currently represents the Z value for the corresponding block of Z-buffer. In one embodiment of the present invention, when Init Bit 425 is set, the corresponding block of Z-buffer is not initialized; and, INIT register 430 is read to access the Z value for the corresponding block of Z-buffer. Thus, initialization can be completed without writing to the entire block of Z-buffer. In one embodiment of the present invention, when Init Bit 425 is set, the value of INIT register 430 is (optionally) copied to the corresponding block of Z-buffer in a background process (with low priority). Depth compare 440 selectively compare New Z value 460 to the value in INIT register 430 or to the value in the corresponding Z-buffer 450, according to the value of Init Bit for the corresponding block of Z-buffer. When the Init Bit is set (e.g., having a value of 1), the value in the INIT register is used for the Z comparison; when the Init Bit is not set (e.g., having a value of 0), the Z-buffer is read to obtain the background Z value for Z comparison. Thus, when the Init Bit is set, the Z-buffer read cycle is not necessary. If the image associated with the New Z value is to be painted, the New Z value will be written into the Z-buffer; and, the Init Bit will be unset (to have a value of 0) to indicate that the value in the INIT register is no longer valid. Thus, Init Bit 425 allows for determining whether any data in screen 410 has been modified.

Figure 5:
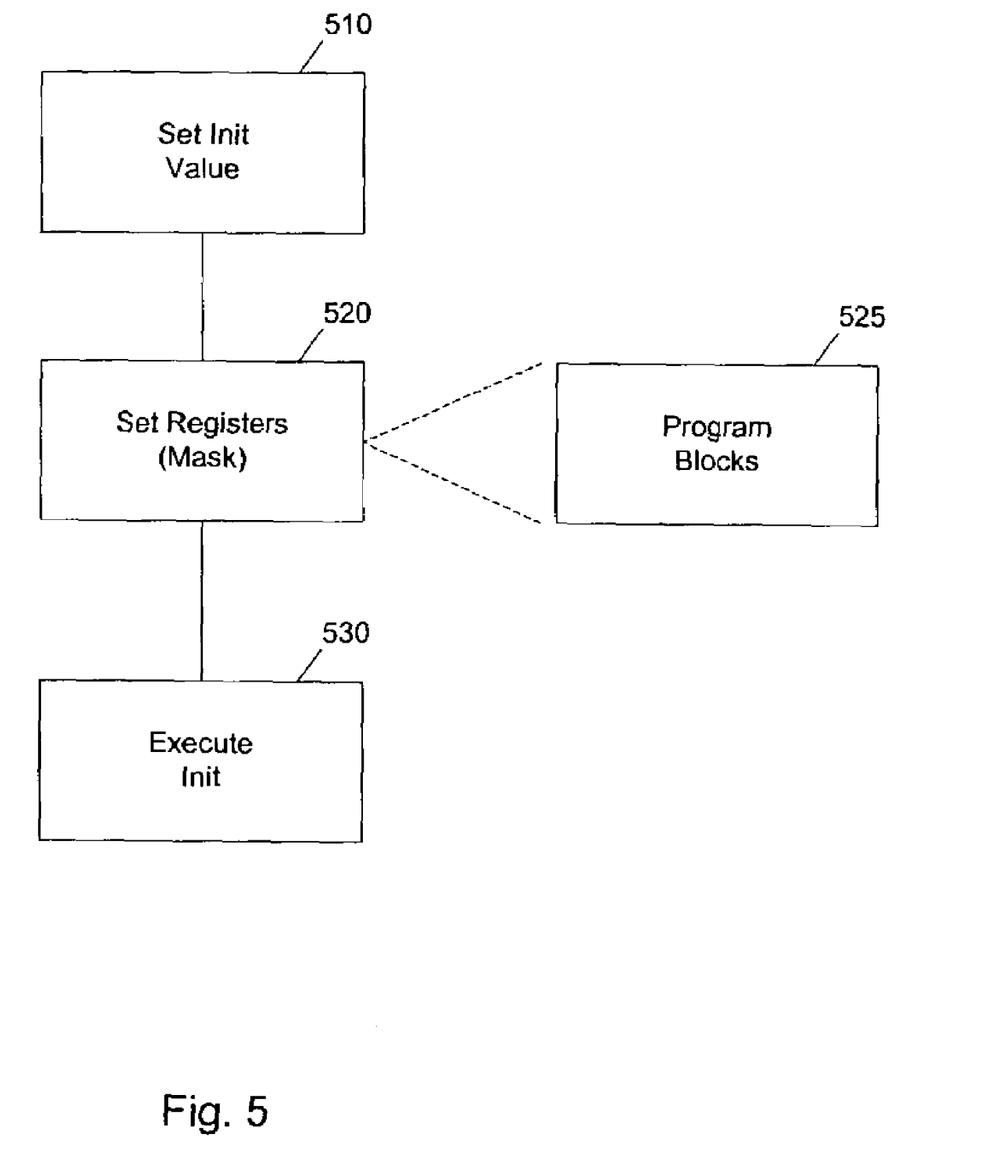
FIG. 5 provides a flow diagram of an embodiment of a method of initializing a Z-buffer.

FIG. 5 provides a flow diagram of an embodiment of a method of initializing a Z-buffer. At block 510, the Init value for a screen is set to a predetermined value. At block 520, registers (bits or flip-flops for example) are set with a mask pattern using a single command to cause the corresponding sectors of a screen's Z-buffer to be represented by the Init value that is set at block 510. Note that block 520 may also include block 525, where block size or start and end points are programmed. At block 530, the status bits are set according to the mask pattern. No write to the corresponding Z-buffer is necessary. In one embodiment of the present invention, after the Init instruction or operation is executed, the corresponding Z-buffer map is initialized to the Init value in a low priority background process (e.g., when a block of Z-buffer is not accessed); and, additional bookkeeping is performed to record the blocks that have been initialized to the Init value in the background.

Figure 6:
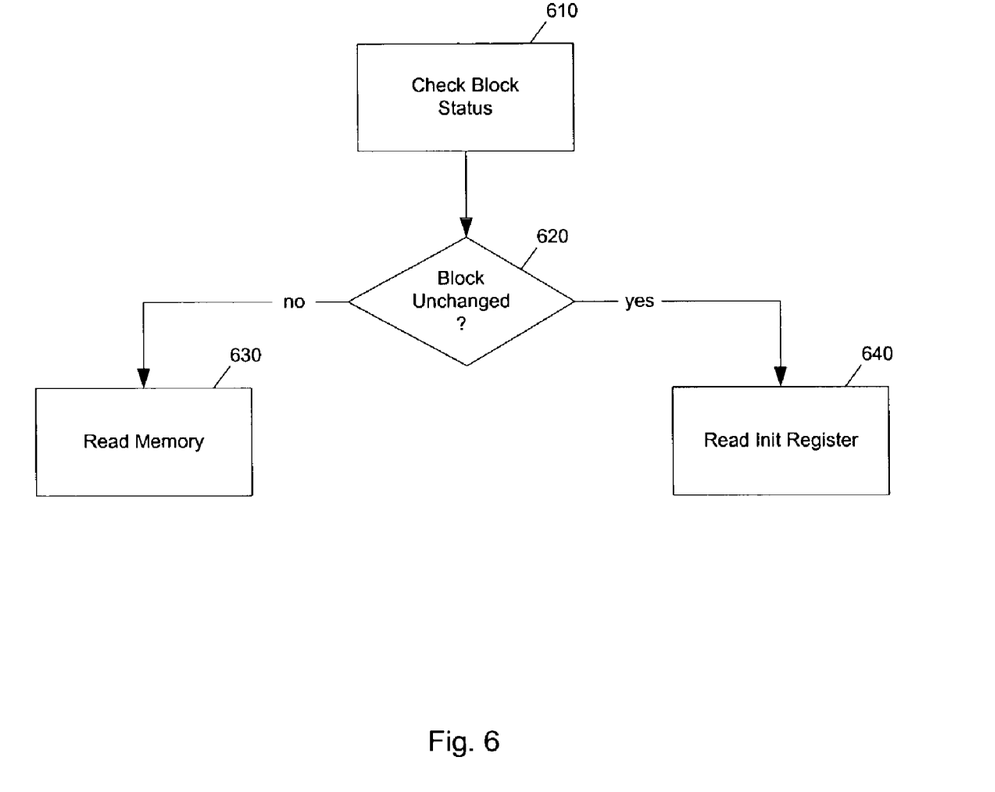
FIG. 6 provides a flow diagram of an embodiment of a method of reading from a Z-buffer.

FIG. 6 provides a flow diagram of an embodiment of a method of reading from a Z-buffer. At block 610, status of the block that contains the data location in question is checked for modification. At block 620, a determination is made as to whether the block in question has been modified. If the block has been modified (block changed), the memory is read from the data location at block 630. If the block has not been modified (block unchanged), the Init register is read at block 640, as that is the data which is currently valid for the data location in question.

Figure 7:
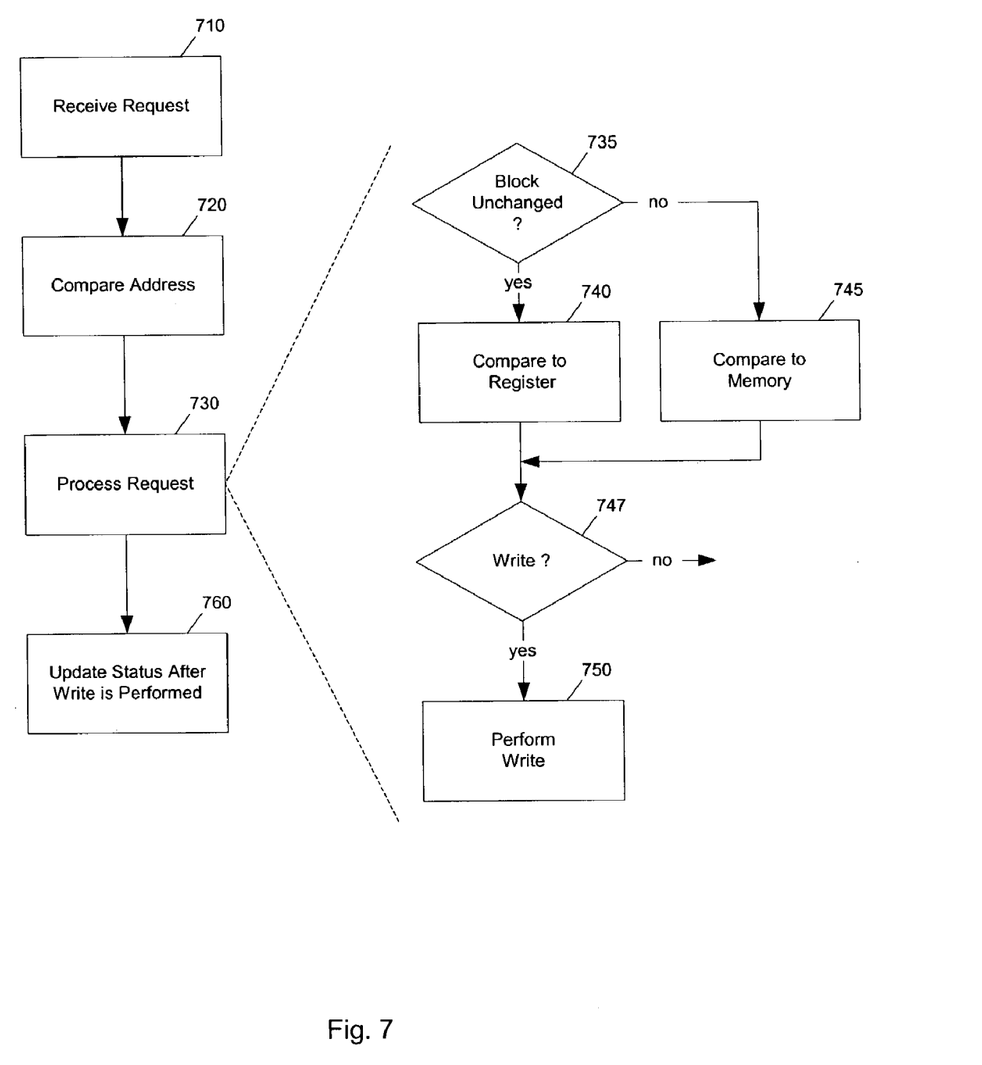
FIG. 7 provides a flow diagram of an embodiment of a method of writing to a Z-buffer.

FIG. 7 provides a flow diagram of an embodiment of a method of accessing to a Z-buffer. At block 710, a request is received. At block 720, the address of the request is compared to determine which block or sector contains the data location in question. At block 730, the request is processed, determining whether the data location has been modified since an initialization and whether the data to be written should be written. At block 760, the status of the block in question is updated if any write actually occurs. In one embodiment, block 730 causes blocks 735-750 to be used. At block 735, a determination is made if the sector is unchanged. If the sector is unchanged, the value of the Init register is compared to the data to be written at block 740 for Z comparison. If the sector is changed, a comparison between the value in memory and the value to be written is made. The result of the Z comparison indicates whether the new Z value should be written (when the image of the new Z value data is in front of the image of the depth indicated by the Z-buffer, the new Z value should be written into the Z-buffer). At block 750, the write is performed if the data should be written into the Z-buffer.

Figure 8:
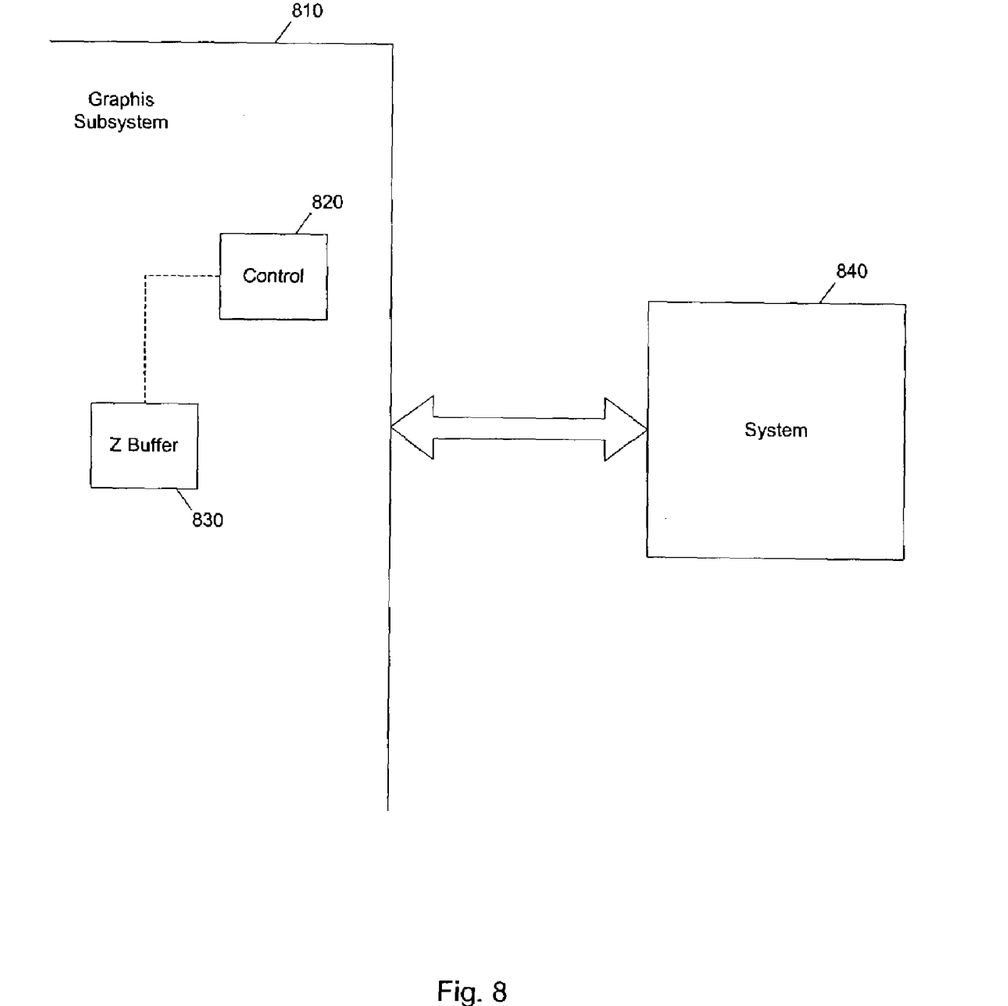
FIG. 8 illustrates an embodiment of a graphics subsystem.

FIG. 8 illustrates an embodiment of a graphics subsystem. Subsystem 810 includes control 820 and Z-buffer 830. The subsystem 810 may also include image memory, various engines (rendering engine, 2D or 3D engine for example) and other components as appropriate. Graphics subsystem 810 communicates with system 840, and interacts with or controls a monitor within system 840 when graphics operations are displayed. In one embodiment, flip-flops or bits related to sectors and initialization, along with an init register, are included in control 820, while Z-buffer 830 includes the memory representing the actual Z-buffer and which may be virtually initialized through the use of the initialization register and status flip-flops.

Figure 9:
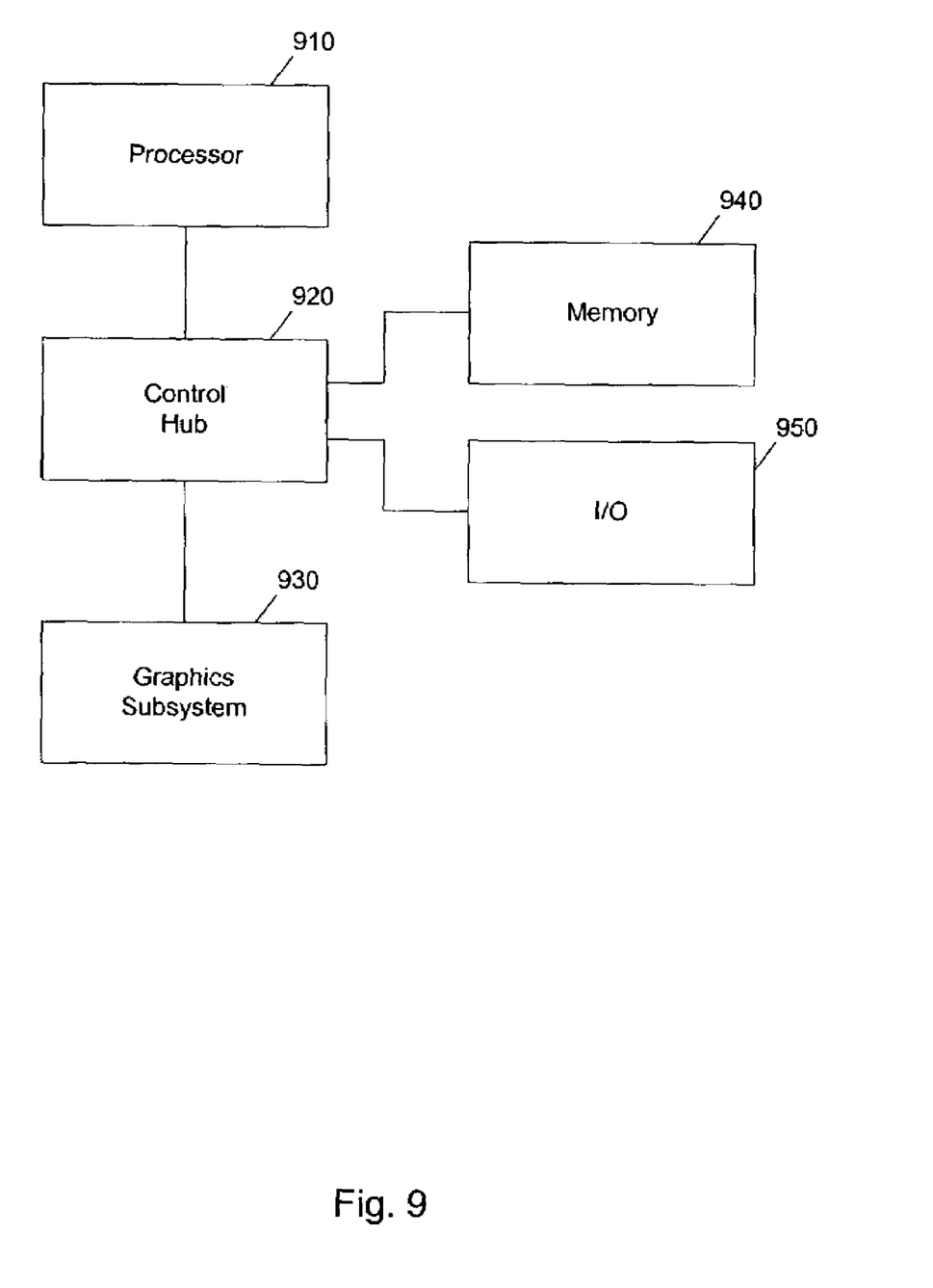
FIG. 9 illustrates an embodiment of a system.

FIG. 9 illustrates an embodiment of a system. Processor 910 is coupled to control hub 920. Control hub 920 is also coupled to graphics subsystem 930, to memory 940 and to I/O interface(s) 950. Thereby, processor 910 is coupled to each of graphics subsystem 930, memory 940 and I/O interface(s) 950. In one embodiment, graphics subsystem 930 includes a processor which may execute instructions to perform the methods described previously, and may either include or work with portions of the components described previously.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a computer readable storage medium such as but not limited to any type of disk including floppy disks, optical disks, CD ROMs and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIG. 7 or 8 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the present description.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (e.g., program, procedure, application, or others) as taken in action or causing a result. Such expressions are merely a shorthand way of saying that execution of the software by a computer causes the processor of the computer to perform an action or produce a result.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus, comprising:
a Z-buffer memory, the Z-buffer memory comprising a plurality of elements, wherein each of the plurality of elements is configured to store data corresponding to a pixel;
a set of status bits that is separate from the Z-buffer memory, each status bit of the set of bits corresponding to a block of the Z-buffer memory, wherein at least one of the blocks comprises a set of elements in the plurality of elements, and wherein the block has a size of n×m, wherein n and m are each any number greater than 1;
an initialization register to store an initial Z value, wherein the initialization register is separate from the Z-buffer memory; and
a control logic coupled to the Z-buffer memory, the set of status bits, and the initialization register, the control logic to retrieve the initial Z value from the initialization register when access to the block of the Z-buffer memory with a corresponding one of the set of status bits being in a first state is requested, wherein the control logic is configured to store the initial Z value into the initialization register during an initialization of the Z-buffer memory, and to set the status bits to the first state, while avoiding writing the initial Z value to the Z-buffer memory.

2. The apparatus of claim 1, further comprising a block size register to store an indication of a block size of the block of the Z-buffer memory.

3. The apparatus of claim 1, wherein the control logic further retrieve a Z value from the Z-buffer memory when access to the block of the Z-buffer memory with a corresponding one of the set of status bits being in a second state is requested.

4. The apparatus of claim 3, further comprising a block size register to store an indication of a block size of the blocks of the Z-buffer memory.

5. The apparatus of claim 3, further comprising a block information register set to store an indication of a block start and end address of each block of the Z-buffer memory.

6. The apparatus of claim 3, wherein the control logic compares a new Z value to a Z value retrieved from one of:
a) the initialization register; and
b) the Z-buffer memory; according to a state of one of the set of status bits.

7. The apparatus of claim 3, wherein the control logic sets the set of status bits to the first state upon receipt of an initialization request.

8. The apparatus of claim 3, wherein the control logic sets one of the set of status bits to the second state upon a modification to the block of the Z-buffer memory.

9. A graphics subsystem, comprising:
a Z-buffer memory, the Z-buffer memory comprising a plurality of elements, wherein each of the plurality of elements is configured to store data corresponding to a pixel; and
a graphics processor coupled to the Z-buffer, the graphics processor including:
a set of status bits that is separate from the Z-buffer memory, each status bit of the set of status bits corresponding to a block of the Z-buffer memory, wherein at least one of the blocks comprises a set of elements in the plurality of elements, and wherein the block has a size of n×m, wherein n and m are each any number greater than 1;
an initialization register to store an initial Z value, wherein the initialization register is separate from the Z-buffer memory; and
a control logic coupled to the Z-buffer memory, the set of status bits, and the initialization register, the control logic to retrieve the initial Z value from the initialization register when access to the block of the Z-buffer memory with a corresponding one of the set of status bits being in a first state is requested, wherein the control logic is configured to store the initial Z value into the initialization register during an initialization of the Z-buffer memory, and to set the status bits to the first state while avoiding writing the initial Z value to the Z-buffer memory.

10. The graphics subsystem of claim 9, wherein the control logic further retrieve a Z value from the Z-buffer memory when access to the block of the Z-buffer memory with a corresponding one of the set of status bits being in a second state is requested.

11. The graphics subsystem of claim 10 further comprising a block size register to store an indication of a block size of the block of the Z-buffer memory.

12. The graphics subsystem of claim 10 further comprising a block information register set to store an indication of a block start and end address of each block of the Z-buffer memory.

13. The graphics subsystem of claim 10, wherein the control logic compares a new Z value to a Z value retrieved from one of:
a) the initialization register; and
b) the Z-buffer memory; according to a state of one of the set of status bits.

14. A system, comprising:
a processor;
a monitor; and
a graphics subsystem coupled to the processor and coupled to the monitor, including:
a Z-buffer memory, the Z-buffer memory comprising a plurality of elements, wherein each of the plurality of elements is configured to store data corresponding to a pixel; and
a graphics processor coupled to the Z-buffer, the graphics processor including:
a set of status bits that is separate from the Z-buffer memory, each status bit of the set of status bits corresponding to a block of the Z-buffer memory, wherein at least one of the blocks comprises a set of elements in the plurality of elements, and wherein the block has a size of n×m, wherein n and m are each any number greater than 1;
an initialization register to store an initial Z value, wherein the initialization register is separate from the Z-buffer memory; and
a control logic coupled to the Z-buffer memory, the set of status bits, and the initialization register, the control logic to retrieve a Z value from the initialization register when access to the block of the Z-buffer memory with a corresponding one of the set of status bits being in a first state is requested, wherein the control logic is configured to store the initial Z value into the initialization register during an initialization of the Z-buffer memory, and to set the status bits to the first state while avoiding writing the initial Z value to the Z-buffer memory.

15. A method of initializing a Z-buffer, comprising:
setting an initial Z value in a register to initialize the Z-buffer, wherein the register is separate from the Z-buffer; and
setting a set of status bits that is separate from the Z-buffer to a first state, wherein the setting the initial Z-value in the register is performed while avoiding writing the initial Z value to the Z-buffer, wherein the setting the set of status bits to the first state is to indicate that the value in the register is to be used for Z comparison for the Z-buffer, each of the set of status bits corresponding to a sector of the Z-buffer, the Z-buffer comprising a plurality of elements, wherein each of the plurality of elements corresponds to a pixel to provide a display and at least one of the sectors comprises a set of elements in the plurality of elements, and wherein the sector has a size of n×m, wherein n and m are each any number greater than 1.

16. The method of claim 15, further comprising:
receiving a new data value and an address;
checking whether the sector of the Z-buffer containing the address has been modified since an initialization operation based on a bit of the set of status bits corresponding to the sector;
comparing the new data value to the initial Z value if the sector has been unmodified; and
comparing the new data value to a data value from the Z-buffer if the sector has been modified;
wherein the set of status bits is not in a Z-buffer memory for the Z-buffer.

17. The method of claim 16, further comprising:
writing the new data into the Z-buffer if the new data value is determined to be a foreground value as a result of the comparing.

18. The method of claim 16, further comprising:
setting the bit of the set of status bits corresponding to the sector to a second state in response to the writing.

19. The method of claim 16, further comprising:
if the new data value is determined to be a foreground value as a result of the comparing:
writing the new data into the Z-buffer, and
setting the bit of the set of status bits corresponding to the sector to a second state.

20. A method, comprising:
receiving an address and a new data value;
checking whether a first sector of a Z-buffer containing the address has been modified since an initialization operation of the Z-buffer based on a status bit of a set of status bits corresponding to the first sector, each of the set of status bits corresponding to a sector of the Z-buffer, wherein the set of status bits is separate from the Z-buffer, the Z-buffer comprising a plurality of elements, wherein each of the plurality of elements corresponds to a pixel to provide to a display and at least one of the sectors comprises a set of elements in the plurality of elements, and wherein the sector has a size of n×m, wherein n and m are each any number greater than 1, and wherein the initialization operation of the Z-buffer includes storing an initial Z value in a register that is separate from the Z-buffer, setting the set of status bits to a first state, wherein the storing the initial Z value in the register is performed while avoiding writing the initial Z value to the Z-buffer;
comparing the new data value to a value in a register if the first sector has been unmodified; and
comparing the new data value to a data value from the Z-buffer if the first sector is modified.

21. The method of claim 20, further comprising:
writing the new data into the Z-buffer if the new data value is determined to be a foreground value as a result of the comparing.

22. The method of claim 20, further comprising:
setting the bit of the set of status bits corresponding to the first sector to a second state in response to the writing;
wherein the set of status bits is not in a Z-buffer memory for the Z-buffer.

23. A computer-readable medium embodying instructions, the instructions, when executed by a processor, causing the processor to perform a method of initializing a Z-buffer, the method comprising:
setting an initial Z value in a register to initialize the Z-buffer, wherein the register is separate from the Z-buffer; and
setting a set of status bits that is separate from the Z-buffer to a first state, wherein the setting the initial Z-value in the register is performed while avoiding writing the initial Z value to the Z-buffer for initialization, and wherein the setting the set of status bits is to indicate that the value in the register is to be used for Z comparison for a Z-buffer, each of the set of status bits corresponding to a sector of the Z-buffer, the Z-buffer comprising a plurality of elements, wherein each of the plurality of elements corresponds to a pixel to provide to a display and at least one of the sectors comprises a set of elements in the plurality of elements, and wherein the sector has a size of n×m, wherein n and m are each any number greater than 1.

24. The computer-readable medium of claim 23, wherein the method further comprises:

receiving a new data value and an address;

checking whether the sector of the Z-buffer containing the address has been modified since an initialization operation based on a bit of the set of status bits corresponding to the sector;

comparing the new data value to the initial Z value if the sector has been unmodified; and comparing the new data value to a data value from the Z-buffer if the sector has been modified;

wherein the bit of the set of status bits is not in a Z-buffer memory comprising the Z-buffer.

25. An apparatus to initialize a Z-buffer, comprising:

means for setting an initial Z value in a register to initialize the Z-buffer, wherein the register is separate from the Z-buffer; and means for setting a set of status bits that is separate from the Z-buffer to a first state, wherein the setting the initial Z-value in the register is performed while avoiding writing the initial Z value to the Z-buffer, wherein the setting the set of status bits to the first state is to indicate that the value in the register is to be used for Z comparison for the Z-buffer, each of the set of status bits corresponding to a sector of the Z-buffer, the Z-buffer comprising a plurality of elements, wherein each of the plurality of elements corresponds to a pixel to provide to a display, wherein at least one of the sectors comprises a set of elements in the plurality of elements, and wherein the sector has a size of n×m, wherein n and m are each any number greater than 1.

* * * * *